(12) United States Patent
Sandstrom et al.

(10) Patent No.: US 10,744,733 B2
(45) Date of Patent: Aug. 18, 2020

(54) TIRE CONTAINING SILICATE MICROFLAKES HAVING ENHANCED TRACTION CHARACTERISTICS

(71) Applicants: Paul Harry Sandstrom, Cuyahoga Falls, OH (US); John Joseph Andre Verthe, Kent, OH (US); Ping Zhang, Westford, MA (US)

(72) Inventors: Paul Harry Sandstrom, Cuyahoga Falls, OH (US); John Joseph Andre Verthe, Kent, OH (US); Ping Zhang, Westford, MA (US)

(73) Assignee: THE GOODYEAR TIRE & RUBBER COMPANY, Akron, OH (US)

(*) Notice: Subject to any disclaimer, the term of this patent is extended or adjusted under 35 U.S.C. 154(b) by 925 days.

(21) Appl. No.: 14/492,660

(22) Filed: Sep. 22, 2014

(65) Prior Publication Data

US 2015/0007926 A1 Jan. 8, 2015

Related U.S. Application Data

(62) Division of application No. 13/218,507, filed on Aug. 26, 2011, now abandoned.

(51) Int. Cl.
*B29D 30/66* (2006.01)
*B29D 30/02* (2006.01)
(Continued)

(52) U.S. Cl.
CPC .............. *B29D 30/66* (2013.01); *B29D 30/02* (2013.01); *B60C 1/0016* (2013.01);
(Continued)

(58) Field of Classification Search
CPC .. B29D 30/66; B29D 30/02; B29D 2030/665; B29D 2030/667; B29K 2023/22;
(Continued)

(56) References Cited

U.S. PATENT DOCUMENTS

| 1,719,628 A | * | 7/1929 | Sloman | B60C 11/00 |
| | | | | 152/209.5 |
| 5,614,041 A | * | 3/1997 | Dumke | B60C 11/00 |
| | | | | 152/209.5 |

(Continued)

FOREIGN PATENT DOCUMENTS

| DE | 102006029046 A1 * | 1/2008 | ............. B26D 30/58 |
| JP | 2002053704 A * | 2/2002 | ............... B60C 1/00 |
| WO | WO | 4/2009 | |
| | 2009/039039889 | | |

OTHER PUBLICATIONS

Machine translation of JP2002-053704 (no date).*

*Primary Examiner* — Steven D Maki
*Assistant Examiner* — Philip N Schwartz
(74) *Attorney, Agent, or Firm* — Alvin Rockhill

(57) ABSTRACT

This invention discloses a tire having enhanced wet traction and ice traction characteristics. These tires are comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, wherein the tread includes at least one circumferential groove which separates circumferential ribs, each circumferential groove having two sides and a base therebetween, and wherein the sides of each circumferential groove are comprised of a rubbery composition that includes silicate microflakes which are substantially aligned in an orientation which is parallel with the sides of the grooves.

20 Claims, 4 Drawing Sheets

(51) Int. Cl.
  *B60C 11/13* (2006.01)
  *B60C 1/00* (2006.01)
  *B60C 11/14* (2006.01)
  *B29K 23/00* (2006.01)
  *B29K 509/08* (2006.01)

(52) U.S. Cl.
  CPC .... *B60C 11/1346* (2013.01); *B29D 2030/665* (2013.01); *B29D 2030/667* (2013.01); *B29K 2023/22* (2013.01); *B29K 2509/08* (2013.01); *B29K 2995/0097* (2013.01); *B60C 2011/142* (2013.01)

(58) Field of Classification Search
  CPC ... B60C 1/0016; B60C 11/1346; B60C 11/14; B60C 2011/145
  See application file for complete search history.

(56) References Cited

U.S. PATENT DOCUMENTS

| | | | |
|---|---|---|---|
| 7,122,090 B2 | 10/2006 | Tsumori et al. | 156/128.6 |
| 2005/0182177 A1* | 8/2005 | Hochi | B60C 1/0016 524/445 |
| 2007/0062623 A1 | 3/2007 | Chassagnon | 152/209.1 |
| 2008/0041511 A1 | 2/2008 | Watkinson | 152/210 |
| 2009/0041511 A1 | 2/2009 | Fuwa et al. | 399/284 |
| 2010/0154948 A1 | 6/2010 | Dahlberg et al. | 152/209.4 |

\* cited by examiner

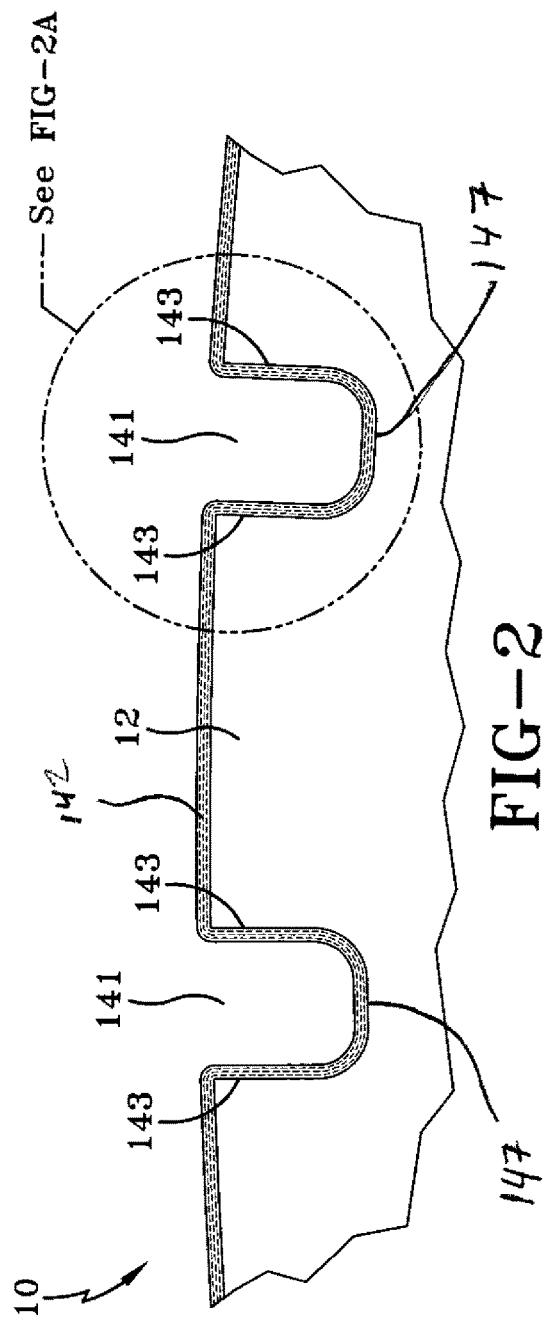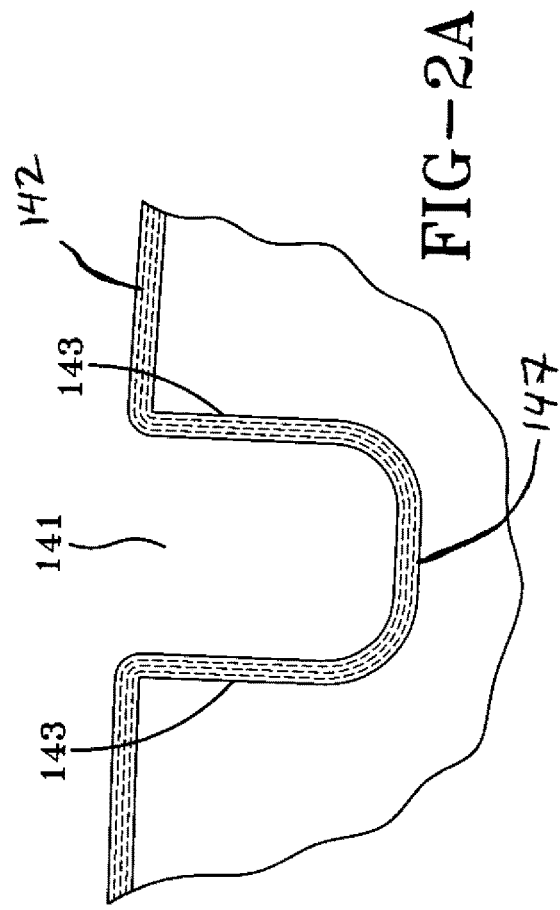

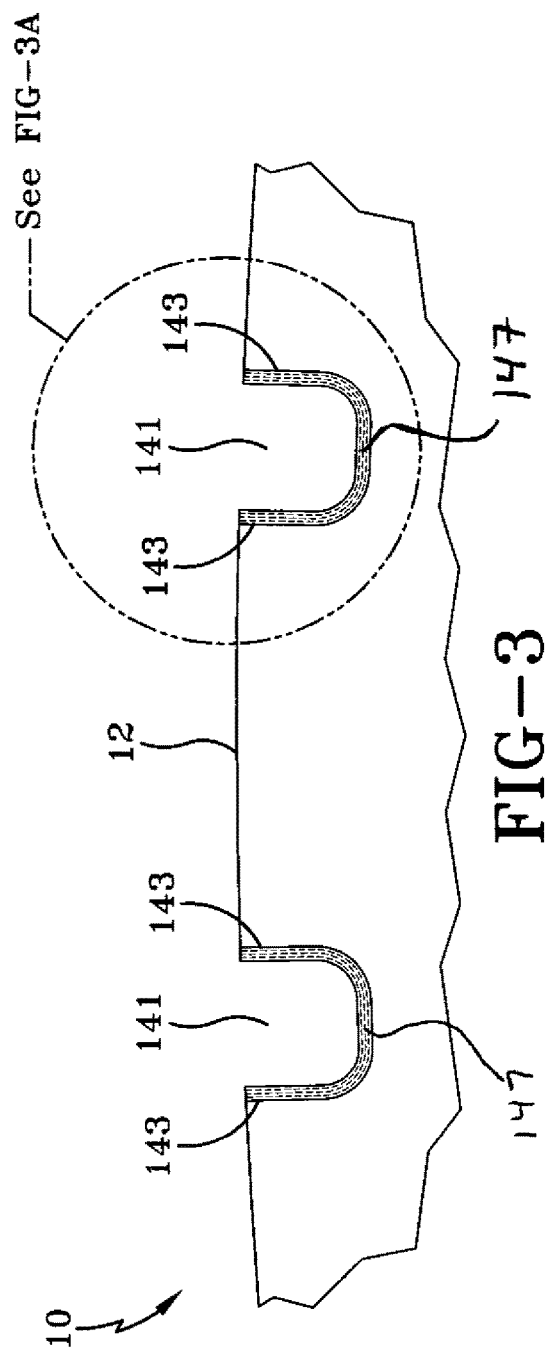
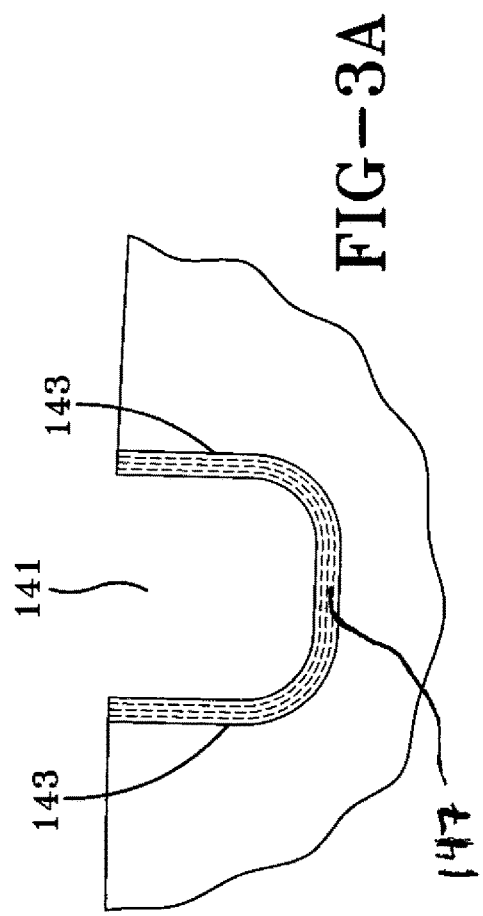

ional of U.S. patent application Ser. No. 13/218,507, filed on Aug. 26, 2011 (presently pending). The teachings of U.S. patent application Ser. No. 13/218,507 are incorporated herein by reference in their entirety.

BACKGROUND OF THE INVENTION

A pneumatic tire typically includes a pair of axially separated inextensible beads. A circumferentially disposed bead filler apex extends radially outward from each respective bead. At least one carcass ply extends between the two beads. The carcass ply has axially opposite end portions, each of which is turned up around a respective bead and secured thereto. Tread rubber and sidewall rubber are located axially and radially outward, respectively, of the carcass ply.

Achieving satisfactory performance in wet and icy conditions requires special characteristics from a tire. Several different features are used to achieve these characteristics. One such feature is the tread combination of grooves and ribs which remove water from the contact surface of the tire rubber and the road surface so that sufficient performance can be achieved in wet conditions. As a means of improving the flow of water through the grooves of a tire, United States Patent Application Publication 2007/0062623 teaches a rubber tread for tires, comprising: a plurality of elements in relief comprising lateral faces and one contact face intended to be in contact along a surface with the roadway during travel of a tire provided with said tread, the limit of the surface of contact of the contact face with the ground forming at least one ridge, a plurality of cutouts in the form of grooves and/or incisions, said cutouts being defined by facing lateral faces, each tread pattern element being formed with at least one first rubber mix (referred to as "base mix"), wherein, viewed in section in a plane containing the thickness of this tread, at least one face defining at least one cutout is covered at least in part with a second rubber mix, referred to as "covering mix", this part having covering mix extending when new over a height Hr at least equal to 30% of the height of the face, wherein at least one base mix opens on to the contact face when new or at the latest after wear at most equal to 10% of the height Hr, said covering mix comprising a butyl rubber, and wherein the covering mix comprises a plasticizer of the unsaturated $C_{12}$-$C_{22}$ fatty acid ester type. Although wet performance was improved with this type of tire tread, there was no significant improvement in icy conditions.

Performance in icy conditions can be achieved by several different means. One way to improve performance in these conditions is to use a softer tread compound which increases the coefficient of friction between the tire and the road. This typically has the detrimental effects of increasing both the rolling resistance and wear of the tread. To reduce the rolling resistance and wear of the tread without compromising on the friction coefficient of the tread, United States Patent Application Publication 2010/0154948 discloses a tire having an axis of rotation, wherein the tire comprises: two sidewalls extending radially outward; and a tread disposed radially outward of the two sidewalls and interconnecting the two sidewalls, the tread comprising a main portion comprising a first compound and a reinforcing structure comprising a second compound having reinforcing short fibers oriented between −20° to +20° to a circumferential direction of the tread, the main portion of the tread comprising at least one circumferential groove separating circumferential ribs, each circumferential groove having two sides and a base therebetween, the reinforcing structure comprising a layer of the second compound secured to the sides of each circumferential groove.

Another way to improve traction in icy conditions is to use studs. Using studs, however, causes damage to the road surface. To attain a portion of the benefits of a studded tire without causing damage to the road surface, United States Patent Application Publication 2009/0041511 discloses a vehicle tire, comprising; a filler including glass flake. The glass flake, however, is not oriented in any particular direction which provides only a portion of the possible traction advantage while increasing the hardness of the rubber compound.

U.S. Pat. No. 7,122,090 discloses a process for preparing a studless tire having a tread comprising a rubber sheet having a thickness of at most 20 mm, which comprises: extruding a rubber composition containing 2 to 50 parts by weight of short fiber or plate-like material having a Moh's hardness of 3 to 7 based on 100 parts by weight of diene rubber in a tube shape, thereby orienting said short fiber or plate-like material in the circumferential direction of said tube shaped rubber composition; cutting said tube shaped rubber composition at one point in a sidewall thereof in the extrusion direction to obtain a rubber sheet having a complex elastic modulus Ea in the extrusion direction and complex elastic modulus Eb in the 90.degree. direction from the extrusion direction measured at 25° C. which fulfill the following equation: 1.1≤Eb/Ea; cutting said rubber sheet parallel to the extrusion direction to obtain pieces; rotating each piece 90° and laminating the rotated pieces together to form a tread having a thickness of at most 20 mm; and forming a studless tire having said tread. This tire tread has the advantage of increased traction due to the short fibers or plate-like material scratching the road surface, but requires a significant effort to orient these elements. Therefore, there has been a long-felt need for a tire tread which provides improved water channeling ability and increased coefficient of friction with the road surface without increased wear of the tire tread without a substantial increase in manufacturing effort.

SUMMARY OF THE INVENTION

The present invention discloses a tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, wherein the tread includes at least one circumferential groove which separates circumferential ribs, each circumferential groove having two sides and a base therebetween, and wherein the sides of each circumferential groove are comprised of a rubbery composition that includes silicate microflakes which are substantially aligned in an orientation which is parallel with the sides of the grooves.

In another embodiment of the present invention the tire is a pneumatic tire. In yet another embodiment of the present invention the tire is a non-pneumatic tire.

In still another embodiment of the present invention the tire includes a carcass ply radially inward of the tread.

In one specific embodiment of the present invention the microflakes have a thickness between about 0.02 microns and 40 microns and a diameter between about 2 microns to 250 microns. In many cases the microflakes have a thickness which is within the range of about 0.2 microns to 30 microns and a diameter which is within the range of about 6 microns to 100 microns. It is typically preferred for the microflakes have a thickness which is within the range of about 0.4 microns to about 20 microns and a diameter which is within the range of about 10 microns to 60 microns. The microflakes are typically comprised of a member selected from the group consisting of glass, mica, and clay. For instance, the microflakes can be glass microflakes.

In one specific embodiment of the present invention the rubbery composition is comprised of a brominated butyl rubber. The rubbery composition can contain a silica reinforcing filler.

In still another embodiment of the present invention the circumferential ribs include a base portion which is free of silicate microflakes.

The present invention further discloses a process for manufacturing a tire comprising: positioning a cover layer onto an uncured tire having a generally toroidal-shaped carcass with an outer circumferential tread portion, two spaced beads, at least one ply extending from bead to bead and sidewalls extending radially from and connecting said tread portion to said beads, wherein the cover layer is comprised of a rubber compound including at least one rubbery polymer and silicate microflakes, wherein the silicate microflakes are embedded within the cover layer and positioned in such a manner that they are aligned in the cover layer in a manner whereby they are substantially parallel with the circumferential surface of the tread portion of the uncured tire; placing the tire into a curing mold to form a desired tire tread having at least one circumferential groove which separates circumferential ribs, each circumferential groove having two sides and a base therebetween, wherein the silicate microflakes positioned on the sides of the grooves are substantially aligned in an orientation which is parallel with the sides of the grooves; maintaining the uncured tired in the mold at an elevated temperature for a period of time that is sufficient to cure the tire; and removing the tire from the curing mold.

In yet another embodiment of the present invention the cover layer is an extruded sheet of rubber.

Another embodiment of the present invention comprises mechanically removing the cover layer from the circumferentially outer most portion of the tread.

In still another embodiment of the present invention the tread includes circumferential ribs, wherein the tread is adapted to be ground-contacting, and wherein removal of the outer cover results in the base rubber becoming the ground contacting area of the ribs.

BRIEF DESCRIPTION OF THE DRAWINGS

FIG. 2 is a schematic detail cross-sectional view of the tread region for use with the example tire of FIG. 1.

FIG. 2A is a schematic detail cross-sectional view of one groove of the tread region for use with the example tire of FIG. 1.

FIG. 3 is a schematic detail cross-sectional view of the tread region for use with the example tire of FIG. 1 with the outermost portion of the cover layer removed.

FIG. 3A is a schematic detail cross-sectional view of one groove of the tread region for use with the example tire of FIG. 1 with the outermost portion of the cover layer removed.

DETAILED DESCRIPTION OF THE INVENTION

Figure 1:
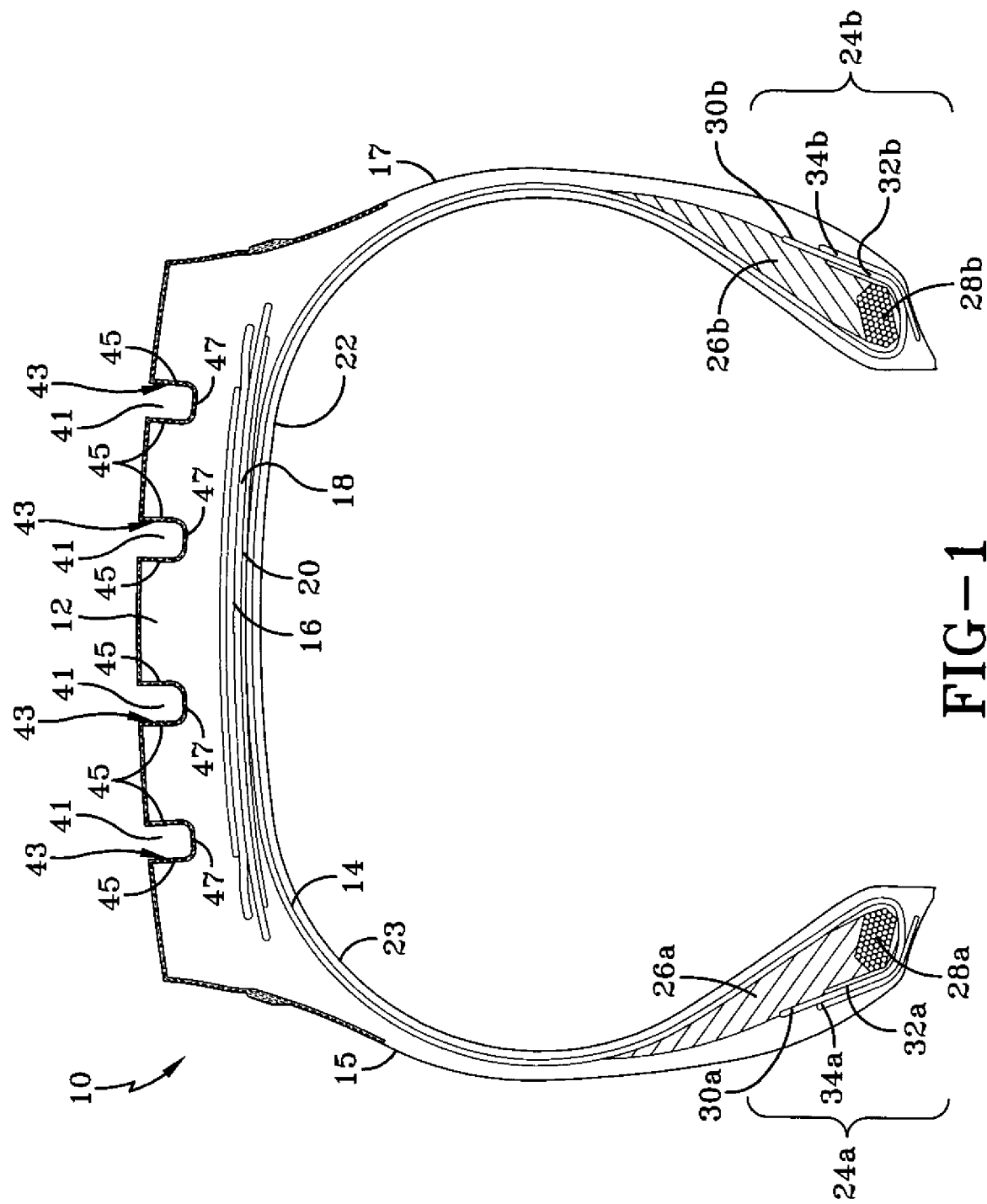
FIG. 1 is a schematic cross-sectional view of an example tire for use with the tread region of the present invention.

FIG. 1 shows an example tire 10 for use with a cover layer in accordance with the present invention. The example tire 10 has a tread 12, an inner liner 23, a belt structure 16 comprising belts 18, 20, a carcass 22 with a carcass ply 14, two sidewalls 15,17, and two bead regions 24a, 24b comprising bead filler apexes 26a, 26b and beads 28a, 28b. The example tire 10 is suitable, for example, for mounting on a rim of a passenger vehicle. The carcass ply 14 includes a pair of axially opposite end portions 30a, 30b, each of which is secured to a respective one of the beads 28a, 28b. Each axial end portion 30a or 30b of the carcass ply 14 is turned up and around the respective bead 28a, 28b to a position sufficient to anchor each axial end portion 30a, 30b.

The carcass ply 14 may be a rubberized ply having a plurality of substantially parallel carcass reinforcing members made of such material as polyester, rayon, or similar suitable organic polymeric compounds. The turned up portions of the carcass ply 14 may engage the axial outer surfaces of two flippers 32a, 32b and axial inner surfaces of two chippers 34a, 34b.

In accordance with the present invention, as shown in FIG. 1, the example tread 12 has four circumferential grooves 41, each having a lining comprising a U-shaped cover section 43. The combination of the cover sections comprise the cover layer. The main portion of the tread 12 may be formed of a first tread compound, which may be any suitable tread compound or compounds. Each cover section 43 occupies the inner surface of a circumferential groove 41 and is formed of a second compound. The second compound includes microflakes that are oriented in such a manner as to be aligned with the cover section 43.

Each circumferential groove 41 is defined by a bottom or base laterally separating a pair of radially extending walls (U-shaped). As seen in FIG. 1, the cover section 43 completely lines each circumferential groove 41, in lateral, radial, and circumferential (not shown) directions. Each covering section 43 includes two radial portions 45, which form opposing walls of the cover section 43 adjacent the radially extending walls of the circumferential grooves 41. Each cover section 43 further has a base portion 47 interconnecting the two radial portions 45 along the base of the circumferential grooves 41. The microflakes in the radial portions 45 are aligned to be parallel to a circumferential direction of the tread 12 and the tire 10.

In accordance with another aspect of the present invention, as shown in FIGS. 2 and 2A, the tire 10 may have a cover layer 142 which completely covers the outermost layer of the tread. The cover layer 142 lines the circumferential grooves 141 and also covers the base portion of the tread 12. The base portion of the tread 12 may be formed of a first tread compound, which may be any suitable tread compound, as described above with respect to FIG. 1. The cover layer 142 is formed of a second compound. The second compound includes silicate microflakes which are oriented in such a manner that they are parallel to the cover layer. In the radial portions 143 and base portions 147 the microflakes will be aligned to a circumferential direction of the tread 12 and the tire 10. Example cover layer 142 may have a uniform thickness between 0.2 mm and 5.0 mm. Preferably cover layer 142 may have a uniform thickness between 0.5 mm and 1.5 mm.

The cover layer rubber formulation of this invention can be used as the outermost layer of tire treads in conjunction with ordinary tire manufacturing techniques. Tires are built utilizing standard procedures with a sheet of the cover layer rubber formulation of this invention simply replacing the outermost layer of the base tread compound. After the tire has been built with the cover layer rubber formulation of this invention, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cureutermost layer of rubber around the tread rubber d at a temperature ranging from about 143° C. (290° F.) to about 154° C. (310° F.). It is generally preferred for the cure cycle used to vulcanize the tires of this invention to have a duration of about 10 to about 14 minutes with a cure cycle of about 12 minutes being most preferred.

In accordance with another aspect of the present invention, the cover layer 143 may be mechanically removed from the outermost surface of the base portion of the tread 12 leaving the second compound lining the radial portions 143 and base portions 147 of the grooves. The removal of the cover layer 143 from the outermost surface of the base portion of the tread 12 can be accomplished for example by grinding the cover layer 143 from the ground contacting surface of the tread 12. Alternatively the cover layer 142 may be left in place to be worn away during use of the tire 10.

Because the second compound lining the radial portions 143 and base portions 147 of the grooves 141 has a lower coefficient of friction with water, the water will be carried through the grooves 141 at a faster rate. In wet conditions, faster removal of the water from the grooves 141 at increases the direct contact between the tire and the road surface because the water which is on the road surface can be more easily moved away from the contact surface.

When the cover layer is removed from the outermost layer of the tread, silicate microflakes are left at the road contacting surface of the radial portions 143 of the grooves. These microflakes are aligned with the radial portions 143 and therefore will have contact the road surface in a blade like manner. This interaction between the road surface and the silicate microflakes, leads to a higher coefficient of friction than could be attained through use of rubber alone. This is particularly useful in icy conditions.

The specific composition and physical properties of the first compound of the tread 12 and the second compound of the cover sections 43 or 143, and the relationships therebetween, will now be discussed. Modulus of elasticity E may measure, among other characteristics, the hardness of a particular compound. In general, the hardness of a homogeneous and uniform tread compound may be both beneficial and detrimental to various performance characteristics of a tire. For example, a harder tread compound may be beneficial in terms of tread wear rate and rolling resistance, when compared to a softer tread compound. However, the harder tread compound may be more susceptible to an edge effect and/or damage and have less wet traction than the softer tread compound.

Conversely, a softer tread compound may be less susceptible to the edge effect and/or damage and have greater wet traction than a harder tread compound. However, the softer tread compound may have a greater tread wear rate and higher rolling resistance than the harder tread compound. The cover sections 43 in accordance with the present invention utilize a second harder and silica microflake reinforced tread compound to take advantage of the benefits of the harder and silicate microflake reinforced tread compound in the area proximal to the circumferential grooves 41 and a softer tread compound for the remaining portion of the tread 12.

Specifically, the stiffer second silicate microflake reinforced compound of the cover sections 43 or 143 at the sides of the circumferential grooves 41 or 241 may limit the deformation of the first softer compound(s) of the adjacent tread ribs (i.e., "barrel" effect) thereby decreasing rolling resistance while sacrificing little, if any, tread wear and/or traction (wet or dry) characteristics. More specifically, the stiffer cover sections 43 or 143 decrease groove/rib deformation thereby decreasing temperature build-up adjacent the grooves and decreasing rolling resistance.

Further, the silicate microflakes of the cover sections 43 or cover layer 143 allow the second compound to be stiffer in the circumferential direction than the radial direction of the tread 12. Thus, the cover sections 43 or 143 in accordance with the present invention may decrease rolling resistance of a tire without the structures by as much as 8%.

Typically the second compound for use as the above cover sections 43 or 143 may be a composition comprising from 1 to 40 phr (parts per weight, per 100 parts by weight of rubber) of silicate microflakes having a thickness ranging from 0.02 microns to 40 microns and a diameter ranging from 2 microns to 250 microns. Preferably the second compound comprises 3 phr to 25 phr of silicate microflakes. More preferably the second compound comprises 5 phr to 10 phr silicate microflakes. Glass, mica, clay and/or other suitable organic and/or inorganic microflakes may alternatively be used in the second compound. Preferably the silicate microflakes will have a thickness ranging from 0.2 to 30 microns and a diameter ranging from 6 to 100 microns. More preferably the silicate microflakes will have a thickness ranging from 0.4 to 20 microns and a diameter ranging from 10 to 60 microns.

The second compound can contain 5 phr to 40 phr of silicate microflakes and can have a thickness ranging from 0.4 microns to 20 microns and a diameter ranging from 10 microns to 60 microns and can be milled into a sheet and cut into tensile test specimens. Tensile test specimens can be cut in two orientations, one with the test pulling direction parallel with the milling direction of the specimen, and one with the test pulling direction perpendicular with the milling direction of the specimen. In this way, the effect of microflake orientation (generally in the direction of milling) and thus the anisotropy of the second compound will be measured. The tensile samples will then be measured for stress at various strains. A stress ratio, defined as the (stress measured in the direction parallel to the milling direction)/(stress measured in the direction perpendicular to the milling direction) will then be calculated for each strain.

In another embodiment of the invention, the second compound for use as the above cover layer 142 may be a rubber composition comprising a diene based elastomer and from 5 phr to 40 phr of silicate microflakes having a thickness ranging from 0.4 microns to 20 microns and a diameter ranging from 10 microns to 60 microns. The silicate microflakes may have disposed on at least part of their surface a composition comprising: an aliphatic fatty acid or synthetic microcrystalline wax; a Bunte salt; a polysulfide comprising the moiety —[S]$_n$ or —[S]$_o$—Zn—[S]$_p$, wherein each of o and p is 1-5, o+p=n, and n=2-6; and sulfur or a sulfur donor.

The silicate microflakes may be provided in a batch with natural rubber. Other microflakes, having similar stiffness, anisotropy, and rubber adhesion, may also be used in accordance with the present invention. Further, the microflakes of the above specified dimensions may be blended with the rubber during compounding/mixing.

An aliphatic fatty acid or synthetic microcrystalline wax may be present in an amount ranging from 10 to 90 percent by weight, based on the weight of the silicate microflakes, the fatty acid or wax, the Bunte salt, and the polysulfide. The aliphatic fatty acid may be stearic acid. The synthetic microcrystalline wax may be polyethylene wax.

The Bunte salt may have the formula (H)$_m$—(R$^1$—S—SO$_3^-$M$^+$)M.xH$_2$O, wherein m is 1 or 2, m' is 0 or 1, and m+m'=2; x is 0-3, M is selected from Na, K, Li, ½Ca, ½Mg, and ⅓Al, and R$_1$ is selected from C$_1$—C$_{12}$ alkylene, C$_1$-C$_{12}$ alkoxylene, and C$_7$-C$_{12}$ aralkylene. The Bunte salt may be disodium hexamethylene-1,6-bis(thiosulfate) dihydrate. The amount of the Bunte salt may range from 0.25 to 25 weight percent, based on the weight of plain microflakes.

The polysulfide may be selected from the group consisting of dicyclopentamethylene thiuram tetrasulfide, bis-3-triethoxysilylpropyl tetrasulfide, alkyl phenol polysulfide, zinc mercaptobenzothiazole, and 2-mercaptobenzothiazyl disulfide. The amount of the polysulfide may range from 0.01 to 15 weight percent, based on the weight of the plain microflakes.

The sulfur may be powdered sulfur, precipitated sulfur, and/or insoluble sulfur. The sulfur donor may be tetramethylthiuram disulfide, tetraethylthiuram disulfide, tetrabutylthiuram disulfide, dipentamethylene thiuram hexasulfide, dipentamethylene thiuram tetrasulfide, dithiodimorpholine, and/or mixtures thereof. The amount of the sulfur or sulfur donor may range from 0.001 to 10 weight percent, based on the weight of the plain microflakes.

The combination of the Bunte salt, the polysulfide, and the sulfur or sulfur donor may be present in an amount ranging from 0.5 to 40 percent by weight, based on the weight of the plain fibers. In one embodiment, the combination of the Bunte salt, the polysulfide, and the sulfur or sulfur donor is present in an amount ranging from 1 to 20 percent by weight, based on the weight of the plain fiber. In one embodiment, the combination of the Bunte salt, the polysulfide, and the sulfur or sulfur donor is present in an amount ranging from 2 to 8 percent by weight, based on the weight of the plain microflake.

The rubber composition may be used with rubbers or elastomers containing olefinic unsaturation. The phrases "rubber or elastomer containing olefinic unsaturation" or "diene based elastomer" are intended to include both natural rubber and its various raw and reclaim forms, as well as various synthetic rubbers. In this description, the terms "rubber" and "elastomer" may be used interchangeably, unless otherwise prescribed. The terms "rubber composition", "compounded rubber", and "rubber compound" are used interchangeably to refer to rubber which has been blended or mixed with various ingredients and materials and such terms are as are well known to those having skill in the rubber mixing or rubber compounding art.

Representative synthetic polymers may be the homopolymerization products of butadiene and its homologues and derivatives, such as methylbutadiene, dimethylbutadiene, and pentadiene, as well as copolymers, such as those formed from butadiene or its homologues or derivatives with other unsaturated monomers. Among the latter may be acetylenes (i.e., vinyl acetylene), olefins (i.e., isobutylene, which copolymerizes with isoprene to form butyl rubber), vinyl compounds (i.e., acrylic acid or acrylonitrile, which polymerize with butadiene to form NBR), methacrylic acid, and styrene (which polymerizes with butadiene to form SBR), as well as vinyl esters and various unsaturated aldehydes, ketones and ethers, e.g., acrolein, methyl isopropenyl ketone, and vinylethyl ether.

Specific examples of synthetic rubbers may include neoprene (polychloroprene), polybutadiene (including cis-1,4-polybutadiene), polyisoprene (including cis-1,4-polyisoprene), butyl rubber, halobutyl rubber (such as chlorobutyl rubber or bromobutyl rubber), styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), and silicon-coupled and tin-coupled star-branched polymers.

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils.

The rubber composition may further include from about 10 to about 150 phr of silica. Siliceous pigments which may be used in the rubber compound include conventional pyrogenic and precipitated siliceous pigments (silica). Such conventional silicas might be characterized, for example, by having a BET surface area, as measured using nitrogen gas. The BET surface area may be in the range of about 40 to about 600 square meters per gram. The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 micron to 0.05 micron, as determined by an electron microscope, although the silica particles may be even smaller, or possibly larger, in size. A wide variety of commercially available silicas can be used with good results.

Commonly employed carbon blacks may be used as a conventional filler in an amount ranging from 10 to 150 phr. The carbon blacks may have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), crosslinked particulate polymer gels, and plasticized starch composite filler. Such other fillers may be used in an amount ranging from 1 to 30 phr.

It may readily be understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. In many cases microcrystalline waxes are used. Typical amounts of peptizers comprise about 0.1 to about 1 phr. Typical peptizers may be, for example, pentachlorothiophenol and dibenzamidodiphenyl disulfide.

Accelerators may be used to control the time and/or temperature required for vulcanization and to improve the properties of the vulcanizate. A single accelerator system may be used, i.e., primary accelerator. The primary accelerator(s) may be used in total amounts ranging from about 0.5 to about 4 phr. Combinations of a primary and a secondary accelerator may be used with the secondary accelerator being used in smaller amounts, such as from about 0.05 to about 3 phr, in order to activate and to improve the properties of the vulcanizate. Combinations of these accelerators may be expected to produce a synergistic effect on the final properties and are somewhat better than those produced by use of either accelerator alone.

In addition, delayed action accelerators may be used which are not affected by normal processing temperatures, but produce a satisfactory cure at ordinary vulcanization temperatures. Vulcanization retarders might also be used. Suitable types of accelerators that may be used are amines, disulfides, guanidines, thioureas, thiazoles, thiurams, sulfenamides, dithiocarbamates and xanthates.

The cover layer rubber formulation including the silicate microflakes can be mixed utilizing a thermomechanical mixing technique. The mixing of the cover layer rubber formulation can be accomplished by methods known to those having skill in the rubber mixing art. For example, the ingredients are typically mixed in at least two stages; namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, silica and sulfur containing organosilicon, and carbon black, if used, are mixed in one or more non-productive mix stages. The terms "non-productive" and "productive" mix stages are well known to those having skill in the rubber mixing art. The sulfur-vulcanizable rubber composition containing the sulfur containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be for a duration of time which is within the range of about 2 minutes to about 20 minutes. It will normally be preferred for the rubber to reach a temperature which is within the range of about 145° C. to about 180° C. and to be maintained at said temperature for a period of time which is within the range of about 4 minutes to about 12 minutes. It will normally be more preferred for the rubber to reach a temperature which is within the range of about 155° C. to about 170° C. and to be maintained at said temperature for a period of time which is within the range of about 5 minutes to about 10 minutes.

The cover layer rubber formulation may be milled, calendared, rolled, and/or extruded to form a sheet with the silicate microflakes with an orientation in the direction of processing, that is, a substantial portion of the silicate microflakes will generally be oriented in a direction which is consistent with, and parallel to, the material flow direction in the processing equipment. The second rubber composition may have a degree of anisotropy, that is, a modulus measured in a direction consistent with the processing direction may be greater than that measured in a direction perpendicular to the processing direction.

Figure 4:
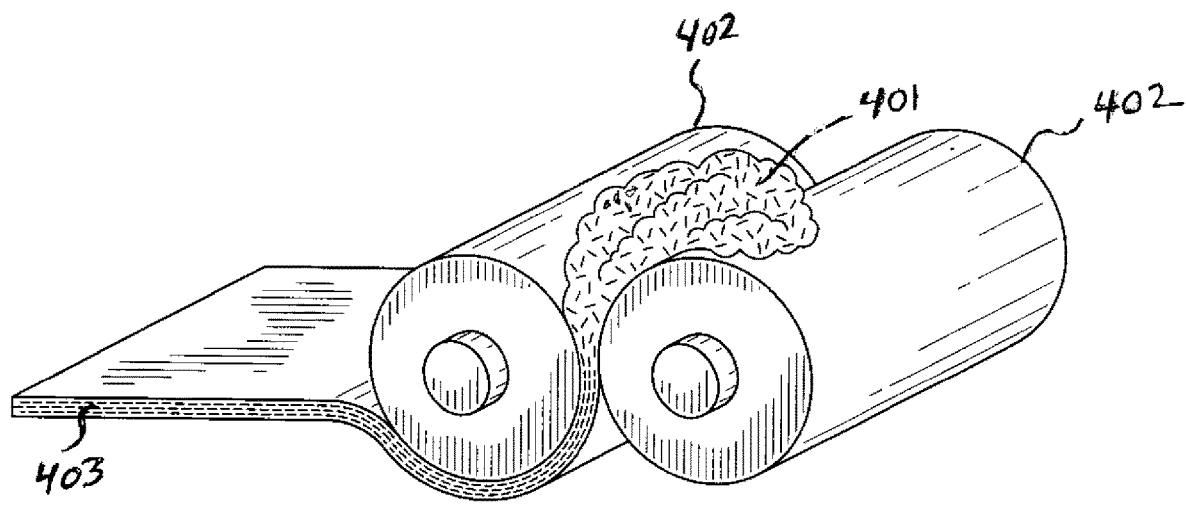
FIG. 4 is a schematic diagram depicting the process for preparing the cover layer of rubber of the present invention.

FIG. 4 shows one such method, which entails extruding the rubber formulation containing silicate microflakes with no specified orientation 401 between rolls 402 to form the sheet with the silicate microflakes aligned along the length of the sheet 403. Another method is to use an extrusion machine 500 to extrude the rubber formulation containing silicate microflakes with no specified orientation 501 through an extrusion die 502 to form the sheet with the silicate microflakes aligned along the length of the sheet 503.

As stated above, located within each circumferential groove 41 or 141 and extending in an essentially circumferential direction relative to the tread 12 is the cover layer 43 or 143. The microflakes of the cover layer 43 or 143 may be substantially oriented in the circumferential direction. By substantially oriented, it is meant that the second compound for the reinforcing structures 43 or 143 may comprise microflakes oriented at an angle ranging from −20 degrees to +20 degrees with respect to the circumferential direction along the tread 12 of the tire 10.

The example pneumatic tire for use with the present invention may be a race tire, passenger tire, runflat tire, aircraft tire, agricultural, earthmover, off-the-road, medium truck tire, or any pneumatic or non-pneumatic tire. In one example, the tire is a passenger or truck tire. The tire may also be a radial ply tire or a bias ply tire.

Vulcanization of the example pneumatic tire may generally be carried out at conventional temperatures ranging from about 100° C. to 200° C. Any of the usual vulcanization processes may be used such as heating in a press or mold and/or heating with superheated steam or hot air. Such tires can be built, shaped, molded and cured by various methods which are known and are readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

An extruded rubber sheet having silicate microflakes dispersed therein oriented in such a manner as to be substantially parallel with the surface of the sheet can be made in accordance with the present invention by mixing natural rubber with about 7.5 phr of silicate microflakes having a thickness of about 5 microns and a diameter of about 45 microns by using mixing techniques well known in the art. In the mixture, the silicate microflakes will be in no specific orientation, as shown by 401 in FIG. 4. The mixture can then be extruded between rolls 402 to form a sheet of rubber with the silicate microflakes aligned with the sheet of rubber as shown by 403.

Example 2

Figure 5:
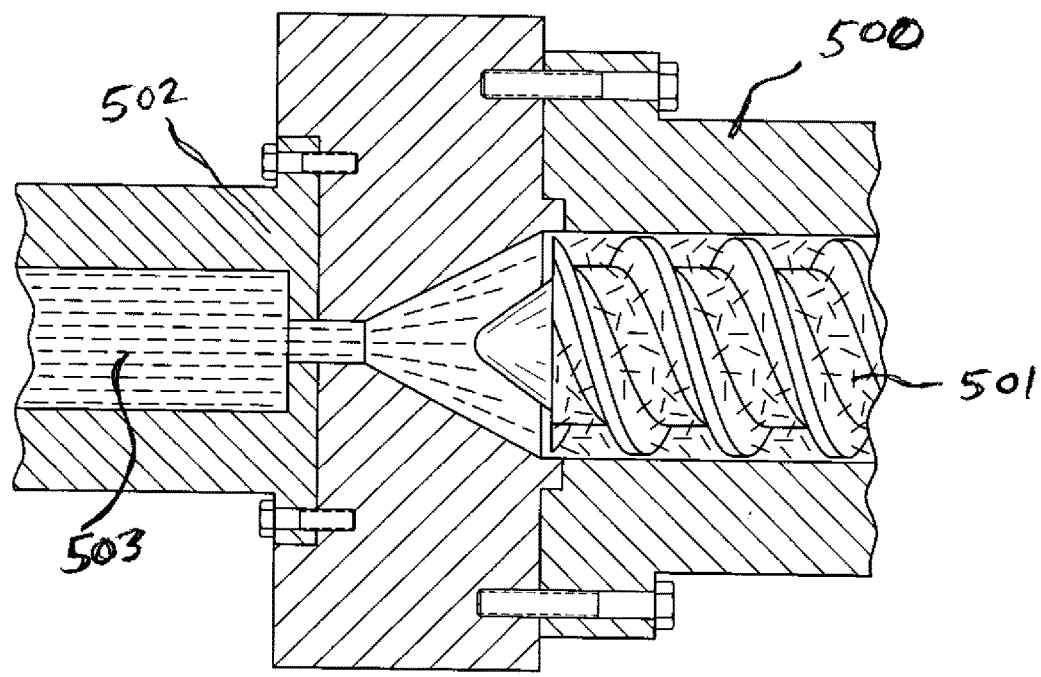
FIG. 5 is a schematic cross sectional view of an apparatus having an extruder and an extrusion head used in the process for preparing the cover layer of rubber of the present invention.

Another embodiment of the present invention can be formed by mixing natural rubber with about 7.5 phr of silicate microflakes having a thickness of about 0.7 microns and a diameter of about 15 microns by using mixing techniques well known in the art. In the mixture, the silicate microflakes will be in no specific orientation, as shown by 501 in FIG. 5. The mixture can then be extruded by use of a screw mechanism which forces the rubber mixture through a die 502 thereby forming a sheet of rubber with the silicate microflakes aligned with the sheet of rubber as shown by 503.

Example 3

A tire in accordance with the present invention can be made by positioning the sheet of rubber from either Example 1 or Example 2 around a tread cap of an uncured tire formed through methods well known in the art. The tire assembly surrounded by the sheet of rubber with silicate microflakes aligned along the length of the sheet can be placed in a mold having the tread pattern formed therein. The uncured tire can then be forced into a mold whereby the sheet of rubber with silicate microflakes aligned along the length of the sheet and the tread cap of the uncured tire if pushed into the tread pattern of the mold to create a desired tread pattern having grooves therein. The uncured tire can then be vulcanized at 150° C. by heating the mold. Once the tire is sufficiently vulcanized to form a cured tire as understood by those skilled in the art, the tire can be removed from the mold.

Example 4

The rubber compound containing silicate microflakes can be removed from the ground contacting tread portion of the tire by grinding away the outer tread surface of the tire. This can be accomplished by grinding the road contacting surface of the tire of Example 3 to a depth that is sufficient to substantially remove the rubber containing the silicate microflakes from the ground contacting tread surface of the tire.

While certain representative embodiments and details have been shown for the purpose of illustrating the subject invention, it will be apparent to those skilled in this art that various changes and modifications can be made therein without departing from the scope of the subject invention.

What is claimed is:

1. A process for manufacturing a tire comprising: (1) positioning a cover layer onto an uncured tire having a generally toroidal-shaped carcass with an outer circumferential tread portion, two spaced beads, at least one ply extending from bead to bead and sidewalls extending radially from and connecting said tread portion to said beads, wherein the cover layer is comprised of a rubber compound including at least one rubbery polymer and glass microflakes, wherein the glass microflakes are embedded within the cover layer and positioned in such a manner that they are aligned in the cover layer in a manner whereby they are substantially parallel with the circumferential surface of the tread portion of the uncured tire, wherein the glass microflakes have a thickness which is within the range of 2 microns to 40 microns, wherein the glass microflakes have a diameter which is within the range of 10 microns to 40 microns, and wherein the cover layer is positioned to completely cover the base portion of the tread; (2) placing the tire into a curing mold to form a desired tire tread which is adapted to have a ground contacting surface and having at least one circumferential groove which separates circumferential ribs, each circumferential groove having two sides and a base therebetween, wherein the glass microflakes positioned on the sides of the grooves are substantially aligned in an orientation which is parallel with the sides of the grooves; (3) maintaining the uncured tired in the mold at an elevated temperature for a period of time that is sufficient to cure the tire; (4) removing the tire from the curing mold; (5) grinding the cover layer from the ground contacting surface of the tread to a depth that is sufficient to substantially remove the rubber containing the glass microflakes from the ground contacting tread surface of the tire, wherein the sides of each circumferential groove have a coefficient of friction with water which is lower than the coefficient of friction with water of the tread.

2. The process as specified in claim 1 wherein the cover layer is an extruded sheet of rubber.

3. The process as specified in claim 1 wherein the tread includes circumferential ribs, and wherein removal of the outer cover results in the base rubber becoming the ground contacting area of the ribs.

4. The process as specified in claim 1 wherein the cover layer is comprised of 1 to 40 parts per weight of the glass microflakes per 100 parts by weight of rubber.

5. The process as specified in claim 1 wherein the cover layer is comprised of 3 to 25 parts per weight of the glass microflakes per 100 parts by weight of rubber.

6. The process as specified in claim 1 wherein the tire is a pneumatic tire.

7. The process as specified in claim 1 further including a carcass ply radially inward of the tread.

8. The process as specified in claim 1 wherein the rubbery composition is comprised of a brominated butyl rubber.

9. The process as specified in claim 8 wherein the rubbery composition is further comprised of a silica reinforcing filler.

10. The process as specified in claim 1 wherein the circumferential ribs include a base portion which is free of glass microflakes.

11. The process as specified in claim 1 wherein the glass microflakes have a thickness which is within the range of 4 microns to 40 microns.

12. The process as specified in claim 1 wherein the glass microflakes have a thickness which is within the range of 6 microns to 40 microns.

13. The process as specified in claim 1 wherein the glass microflakes have a thickness which is within the range of 10 microns to 30 microns.

14. The process as specified in claim 1 wherein the glass microflakes have a diameter which is within the range of 10 microns to 35 microns.

15. The process as specified in claim 1 wherein the glass microflakes have a diameter which is within the range of 10 microns to 30 microns.

16. The process as specified in claim 1 wherein the glass microflakes have a diameter which is within the range of 10 microns to 25 microns.

17. The process as specified in claim 1 wherein the glass microflakes have disposed on at least part of their surface a composition selected from the group consisting of an aliphatic fatty acid, a synthetic microcrystalline wax, a Bunte salt, and a polysulfide.

18. The process as specified in claim 17 wherein the composition selected from the group consisting of aliphatic fatty acids, synthetic microcrystalline waxes, Bunte salts, and a polysulfides is an aliphatic fatty acid.

19. The process as specified in claim 17 wherein the composition selected from the group consisting of aliphatic fatty acids, synthetic microcrystalline waxes, Bunte salts, and a polysulfides is a synthetic microcrystalline wax.

20. The process as specified in claim 19 wherein the microcrystalline wax is a polyethylene wax.

\* \* \* \* \*